(12) United States Patent
Arntz et al.

(10) Patent No.: US 11,473,710 B2
(45) Date of Patent: Oct. 18, 2022

(54) HEATED DRAIN OR VENT PIPE

(71) Applicants: Chad Michael Arntz, Greenville, MI (US); Michael C. Arntz, Greenville, MI (US)

(72) Inventors: Chad Michael Arntz, Greenville, MI (US); Michael C. Arntz, Greenville, MI (US)

(*) Notice: Subject to any disclaimer, the term of this patent is extended or adjusted under 35 U.S.C. 154(b) by 28 days.

(21) Appl. No.: 16/921,787

(22) Filed: Jul. 6, 2020

(65) Prior Publication Data

US 2021/0108752 A1 Apr. 15, 2021

Related U.S. Application Data

(60) Provisional application No. 62/915,332, filed on Oct. 15, 2019.

(51) Int. Cl.
*F16L 53/38* (2018.01)
(52) U.S. Cl.
CPC .................... *F16L 53/38* (2018.01)
(58) Field of Classification Search
CPC ........................................ F16L 53/38
USPC ............................................. 138/33
See application file for complete search history.

(56) References Cited

U.S. PATENT DOCUMENTS

| | | | |
|---|---|---|---|
| 3,526,692 A | | 9/1970 | Onaka |
| 3,949,189 A | * | 4/1976 | Bilbro ............... B23P 15/26 |
| | | | 392/468 |
| 4,455,474 A | * | 6/1984 | Jameson ............ F16L 53/38 |
| | | | 392/472 |
| 4,581,521 A | | 4/1986 | Grise |
| 5,241,147 A | * | 8/1993 | Ahlen ............... F16L 53/34 |
| | | | 219/629 |

(Continued)

FOREIGN PATENT DOCUMENTS

| CN | 205179961 U | 4/2016 |
|---|---|---|
| CN | 206094577 U | 4/2017 |

(Continued)

OTHER PUBLICATIONS

Flexelec Group Omerin, Expert Manufacturer of Flexible Heating Cables and Elements, web page found at www.flexelec.com, downloaded on Jul. 7, 2020.

*Primary Examiner* — Craig M Schneider
*Assistant Examiner* — David R Deal
(74) *Attorney, Agent, or Firm* — Gardner, Linn, Burkhart & Ondersma LLP

(57) ABSTRACT

A heated drain or vent pipe system provides a low-cost and efficient temperature regulator for drain or vent pipes that are exposed to freezing temperatures to prevent the pipes from freezing. The heated pipe system includes an embedded resistance wire connected to a transformer that supplies a low voltage of electricity to the resistance wire. The resistance wire heats up due to electricity passing through the wire and transfers that heat to the pipe. The resistance wire is embedded in the wall of the pipe and maintains the pipe at a temperature above freezing. The heated pipe system may include a safety limit switch to disable the flow of electricity to the resistance wires if the pipe is overheating. The heated pipe system can be installed with air conditioning system drains, roof drains, and two-way vents that are exposed to freezing temperatures.

19 Claims, 7 Drawing Sheets

(56) References Cited

U.S. PATENT DOCUMENTS

| | | | |
|---|---|---|---|
| 5,381,511 A * | 1/1995 | Bahar | F16L 11/12 |
| | | | 392/472 |
| 6,004,639 A * | 12/1999 | Quigley | B29C 70/865 |
| | | | 428/36.3 |
| D472,881 S | 4/2003 | Hauschulz | |
| 6,727,481 B1 * | 4/2004 | Wilds | F16L 53/008 |
| | | | 219/549 |
| 6,756,567 B1 * | 6/2004 | Suen | F27B 17/00 |
| | | | 219/439 |
| 7,084,377 B2 * | 8/2006 | Raterman | B05B 7/1693 |
| | | | 219/481 |
| 7,655,883 B2 | 2/2010 | Heise | |
| 10,408,470 B2 * | 9/2019 | Ashcraft | F24D 19/0095 |
| 2002/0008101 A1 * | 1/2002 | Hauschulz | G05D 23/1935 |
| | | | 219/494 |
| 2002/0124995 A1 | 9/2002 | Moon et al. | |
| 2003/0070720 A1 | 4/2003 | Bergevin et al. | |
| 2005/0083638 A1 * | 4/2005 | Warren | B60H 1/2215 |
| | | | 361/600 |
| 2008/0164009 A1 | 7/2008 | Chong | |
| 2010/0206415 A1 * | 8/2010 | Ellis | F16L 53/37 |
| | | | 138/33 |
| 2013/0042938 A1 * | 2/2013 | Ferrone | F16L 11/127 |
| | | | 138/33 |
| 2015/0069044 A1 * | 3/2015 | Borgmeier | F16L 53/38 |
| | | | 219/492 |
| 2021/0179948 A1 * | 6/2021 | Kochendoerfer | H05B 1/0244 |

FOREIGN PATENT DOCUMENTS

| | | |
|---|---|---|
| CN | 206206884 U | 5/2017 |
| GB | 2489425 | 3/2012 |
| GB | 2490648 | 11/2012 |
| KR | 19990041828 | 12/1999 |
| KR | 100533366 | 12/2005 |
| KR | 100796533 | 1/2008 |
| KR | 100979968 | 9/2010 |
| KR | 101690533 | 12/2016 |
| WO | 2007/040305 | 4/2007 |

* cited by examiner

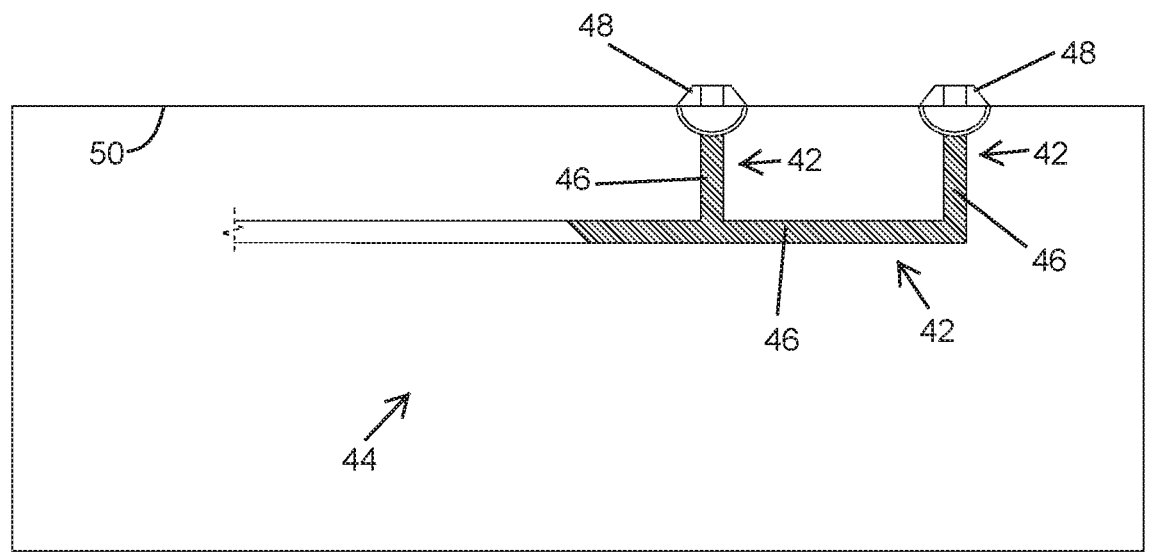
FIG. 7
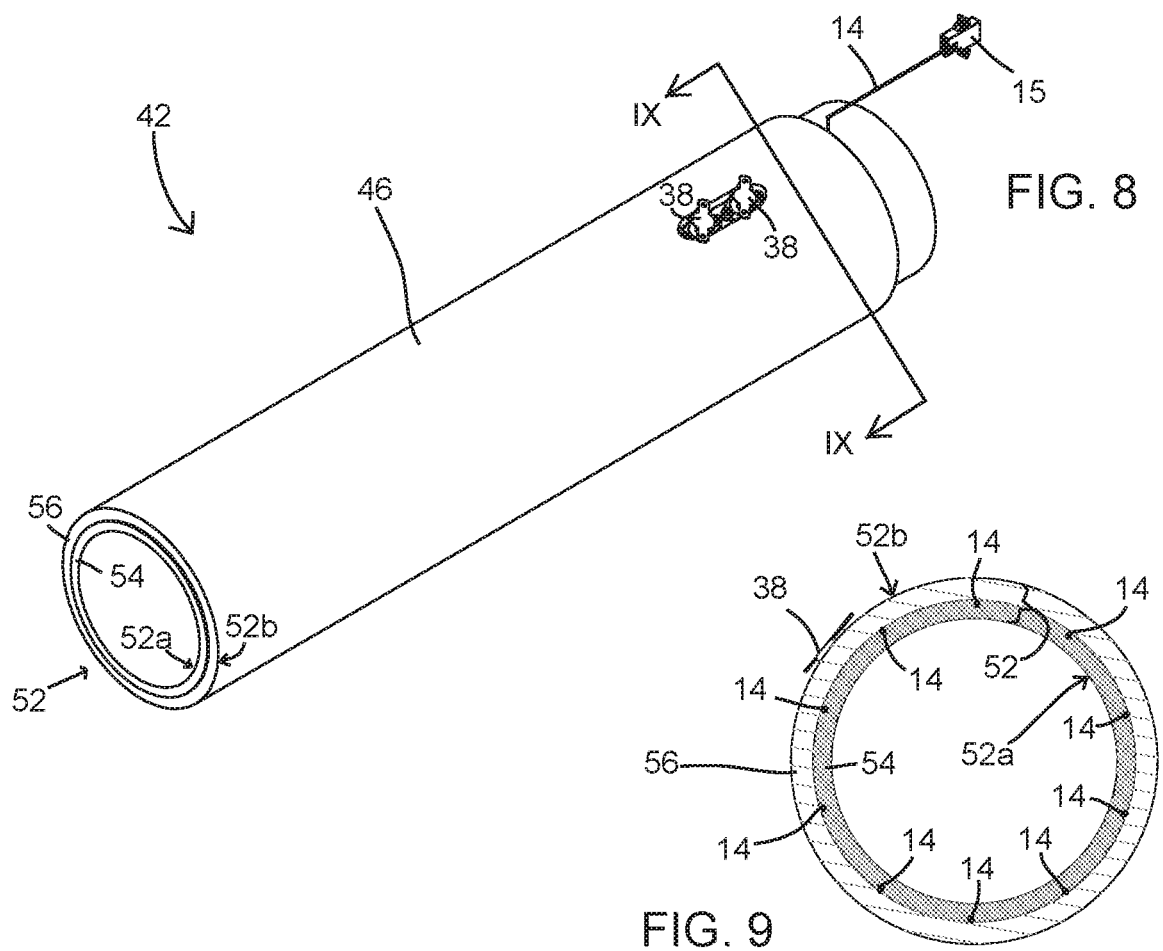
FIG. 8
FIG. 9

HEATED DRAIN OR VENT PIPE

CROSS REFERENCE TO RELATED APPLICATION

The present application claims priority of U.S. provisional application Ser. No. 62/915,332, filed Oct. 15, 2019, which is hereby incorporated herein by reference in its entirety.

FIELD OF THE INVENTION

The present invention is directed to freeze prevention, and more particularly, to freeze prevention for drain pipes and vent pipes that may be exposed to freezing temperatures.

BACKGROUND OF THE INVENTION

Gravity drains and drains or vents connected to condensate pumps are used to remove water from various apparatuses and equipment, including air conditioning units, such as furnaces and boilers, and roof drains. Freezing is typically not a concern for drain pipes in warm weather climates, but in climates that the air temperatures drop below freezing, gravity drains can freeze shut and make the attached equipment in-operable. Frozen pipes can cause pipes to burst and leak or can block the movement of water through the drain causing flooding. Although pipe heat wraps and tapes may be used to protect exposed pipes, such as drain pipes, from freezing in cold weather, pipe wraps and tapes can fail and can be difficult to install properly. The use of pipe wraps and tapes requires sufficient access to the pipe to apply the wrap or tape. In freezing weather conditions, below 32 degrees Fahrenheit, roof drains on buildings begin to freeze. This can be especially dangerous as the roof can become flooded or loaded with excess snow and create excessive weight on the structure that can cause a roof to collapse.

SUMMARY OF THE INVENTION

The present invention provides a heated drain or vent pipe system to remove condensate and waste water created by furnaces, boilers, humidifiers, roof drains and the like, from commercial or residential mechanical rooms or roofs that offer no other economical option for disposal of the condensate and waste water. The elimination of this water is typically done with a condensate pump or a gravity drain system that pumps or drains the water to the outdoors. Freezing weather conditions can freeze gravity drains, making the drain systems inoperable, requiring a costly process to install a floor drain system to overcome this situation. The heated pipe system prevents drain or vent pipes from freezing in below freezing weather conditions. The heated pipe system provides a low cost, safe, dependable, and efficient way to eliminate freezing of the drain pipe in pumped or gravity drain systems, or in vent systems for handling humid air or other freeze-prone gas.

In one form of the present invention, a heated drain or vent pipe system is provided for preventing freezing of contents inside a pipe. The heated drain or vent pipe system includes a pipe configured to drain liquid and/or vapor, a heating element, such as a resistance wire embedded in a wall of the pipe, and a voltage transformer to transform a first voltage from a power source to a second voltage, where the first voltage is higher than the second voltage. The resistance wire is in electrical communication with the voltage transformer and is configured to increase in temperature when the second voltage is introduced to the resistance wire. The resistance wire transfers heat produced by the increase in temperature in the resistance wire from the resistance wire to the pipe. The heat transferred to the pipe maintains the pipe at least above a freezing temperature to prevent the liquid or vapor inside the pipe from frosting and freezing.

In one aspect, the resistance wire is integrally molded inside the wall of the pipe. In another aspect, the heated pipe system includes a channel disposed longitudinally along an outside of the pipe, wherein the resistance wire is disposed inside of the channel. The pipe may be chlorinated polyvinyl chloride (CPVC), polyvinyl chloride (PVC), or a similar pipe material. The pipe may include an inner layer configured to contain a fluid and an outer layer disposed around and in contact with the inner layer. The channel may be disposed in an outer portion of the inner layer and the outer layer insulates the resistance wire disposed inside the channel and insulates the inner layer.

In one aspect, the voltage transformer is adapted to transform a source of electricity from 120 volts AC down to either 24 volts DC or 24 volts AC. The resistance wire may include a separable electrical connecter or terminal disposed at a free end of the wire that extends outside of the wall of the pipe. The connector is configured to couple the wire to the voltage transformer. The length of the resistance wire, the gauge of the wire, the resistance of the wire, and the voltage output of the voltage transformer may be chosen as a function of a length of the pipe that requires heating to prevent frosting and freezing. Embedding a resistance wire into a PVC or a CPVC pipe provides heat to the pipe to elevate the pipe to about 100-130 degrees to prevent the drain from freezing. By matching the resistance, gauge, and length of the wire to the 24-volt output of the transformer, the temperature of the pipe is controlled at a desired level.

In yet another aspect, the heated pipe system includes a limit switch adapted to disable the heated pipe system when the heated pipe system reaches a predetermined temperature. The heated pipe system can be constantly heated or can be wired in series with a temperature controller to selectively energize the resistance wire when the outdoor temperature or ambient air temperature nears the freezing point.

In another form of the present invention, a heated pipe system is disposed in an air conditioning system, such as a high efficiency furnace or boiler. Furnaces and boilers include pipes that exhaust combustion fumes to the outdoors as well as draw in oxygen to support combustion. These pipes are susceptible to freezing in extremely cold weather conditions, which can render the equipment inoperable. The heated pipe system prevents freezing of the air conditioning system pipes. In one aspect, the heated pipe system is operated in conjunction with a condensate elimination pump that pumps condensate from the air conditioning system.

According to another form of the present invention, a heated pipe system is provided in a roof drain system, such as for warehouses that are minimally heated and drains that remove melted snow and rain from building roof tops. The heated pipe system reduces or substantially eliminates the possibility of a roof drain failure and roof collapse due to freezing weather conditions.

According to yet another form of the present invention, a two-way vent system or assembly is provided for simultaneously enabling two independent fluids to flow to or from an air conditioning system while preventing either of the two fluids from frosting or freezing. The two-way vent system includes an inner pipe and an outer pipe with a gap for fluid to pass, such as an air-gap formed in a tubular space defined between the inner and outer pipe. The inner pipe includes a heating element embedded in a wall of the inner pipe. The vent system may include a pest deterrent or fluid hood to prevent unwanted pests, rain, snow, or debris from entering the vent system.

In one aspect a branch pipe fitting is disposed at a proximal end of the vent system and includes a first branch and a second branch. The first branch may be coupled to either of an air conditioning system intake line or an air conditioning system exhaust line. The second branch is coupled to the other of the intake line and the exhaust line. The branch is configured to allow the intake fluid and the exhaust fluid to enter the vent system without interacting or mixing with one another while each passing through one opening in the exterior wall or roof of a building. As such, the vent system reduces the number of openings required through the building to vent or intake fluid into the air conditioning system.

Therefore, the heated pipe system of the present invention provides a low-cost and efficient temperature regulator for drain or vent pipes that are exposed to freezing temperatures, to prevent condensates or other liquids in the pipes from freezing. The heated pipe system includes an embedded resistance wire that is powered by low voltage electricity that is typically supplied by a transformer. The low voltage and the embedded resistance wire provide for high efficiency and safety while providing frost and freeze prevention for the drain or vent pipe. The heated pipe system may include a safety limit switch to disable the flow of electricity to the resistance wires if the pipe is overheating, and may also include a temperature limit switch to ensure that the pipe is heated only when there is a freeze risk. The heated pipe system is useful for various drain pipes and exhaust pipes, such as pipes for air conditioning systems and for roof drains that are exposed to freezing temperatures.

These and other objects, advantages, purposes, and features of the present invention will become more apparent upon review of the following specification in conjunction with the drawings.

BRIEF DESCRIPTION OF THE DRAWINGS

FIG. 7 is a schematic of a heated pipe system for a roof drain in accordance with the present invention, shown as installed on a flat-roofed building;

FIG. 8 is a perspective view of a heated pipe system for a roof drain, in accordance with the present invention;

FIG. 9 is a sectional view of the heated pipe system taken along the line IX-IX of FIG. 8;

DESCRIPTION OF THE PREFERRED EMBODIMENTS

Figure 12:
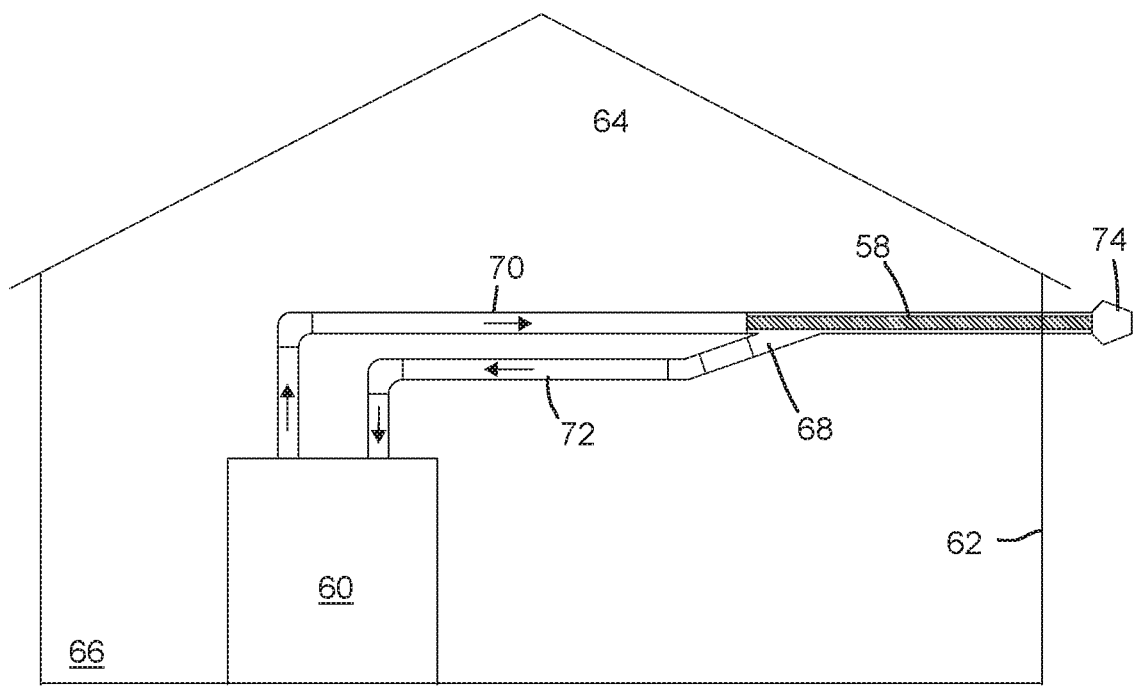
FIG. 12 is a schematic of a heated two-way vent pipe system in accordance with the present invention, for venting an air conditioning system through a wall of a building.
Figure 13:
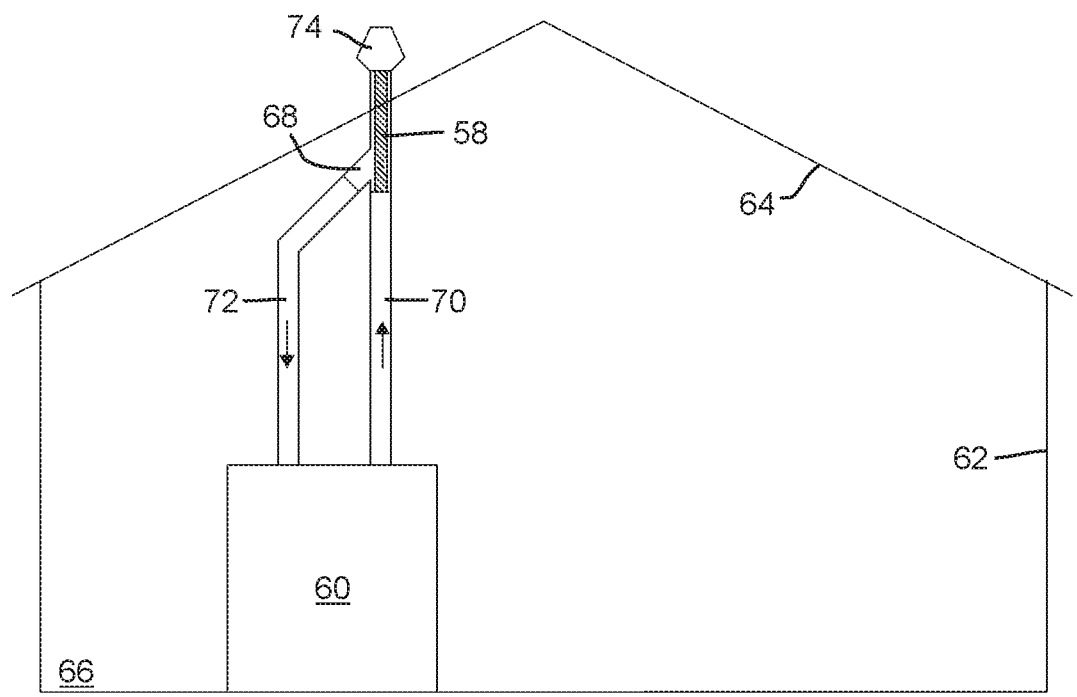
FIG. 13 is a schematic of a heated two-way vent pipe system for venting an air conditioning system through a roof of a building in accordance with the present invention.

Referring now to the drawings and the illustrative embodiments depicted therein, a heated drain or vent pipe system 10 is provided for maintaining or regulating a liquid or vapor filled pipe 12 at a temperature high enough to prevent the liquid or vapor inside the pipe 12 from freezing or frosting (FIGS. 1-6). The heated pipe system 10 includes a heating element in the form of a resistance wire 14 embedded in the wall of the pipe 12 and coupled to an electrical source to introduce electricity into the resistance wire 14 (FIGS. 2-5). The resistance wire 14 is selectively energizable to heat to a temperature sufficient to maintain the pipe 12 at a temperature such that the contents inside will not freeze or frost. Additional features of the heated pipe system 10 include maximum temperature detection sensors and shutoff switches, and an ambient air temperature thermostat. The heated pipe system 10 is particularly useful for drains and vents that transition from an interior of a building to an exterior of a building exposed to freezing temperatures, such as illustrated in FIGS. 1, 7, and 12-13, although other applications are contemplated. For example, the heated pipe system 10 is particularly useful for draining liquids, such as condensation, from furnaces 16 or other air conditioners such as through a wall of a building (FIG. 1); for draining water from roofs, such as at drains on flat roof buildings (FIG. 7); or for venting exhaust vapor from and drawing clean air into furnaces or air conditioners such as through a roof or a wall of a building (FIGS. 12 and 13).

Figure 1:
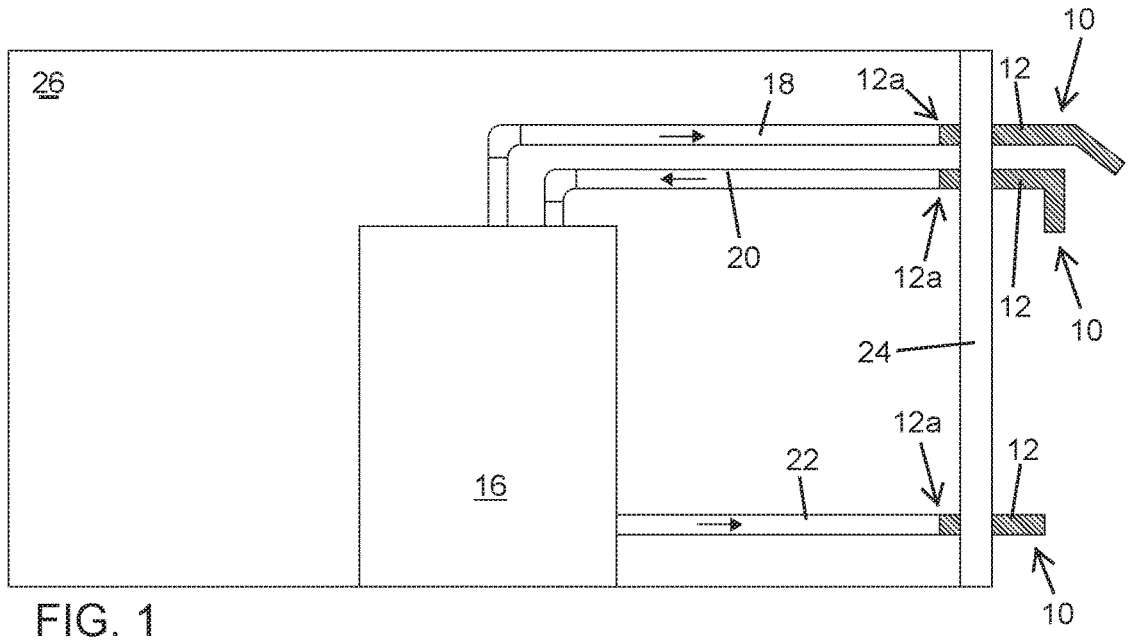
FIG. 1 is a schematic of a heated pipe system for vent lines and a drain line for a furnace, in accordance with the present invention.

In the illustrated embodiment of FIG. 1, a vent line 18, a combustion air intake line 20, and a condensate drain line 22 of a furnace or boiler 16 each include a distal portion formed as a heated pipe system 10, in the line portions illustrated with hashing in FIG. 1. A pipe fitting or coupler 13 (FIG. 3) is provided at an intake or proximal end 12a of the pipe 12 to couple the pipe 12 to a portion of lines 18, 20, and 22 (FIG. 1). A discharge or distal end 12b of the pipe 12 extends through and outside of an exterior wall 24 of a building or furnace room 26 and is open to the atmosphere. High efficiency boilers and furnaces produce or draw in condensation that can be susceptible to freezing in the pipes 18, 20, and 22 at or near the exterior wall 24. Condensation generated in the furnace 16 is expelled from the furnace 16 by a condensate elimination pump (not shown) or a gravity drain. The condensate can sit in the drain pipe 22 for extended periods of time, such that it can freeze in the pipe if exposed to freezing temperatures. The heated pipe systems 10 of the vent pipe 18, intake pipe 20, and condensate pipe 22 prevent freezing of liquid or vapor inside the pipes.

Figure 2:
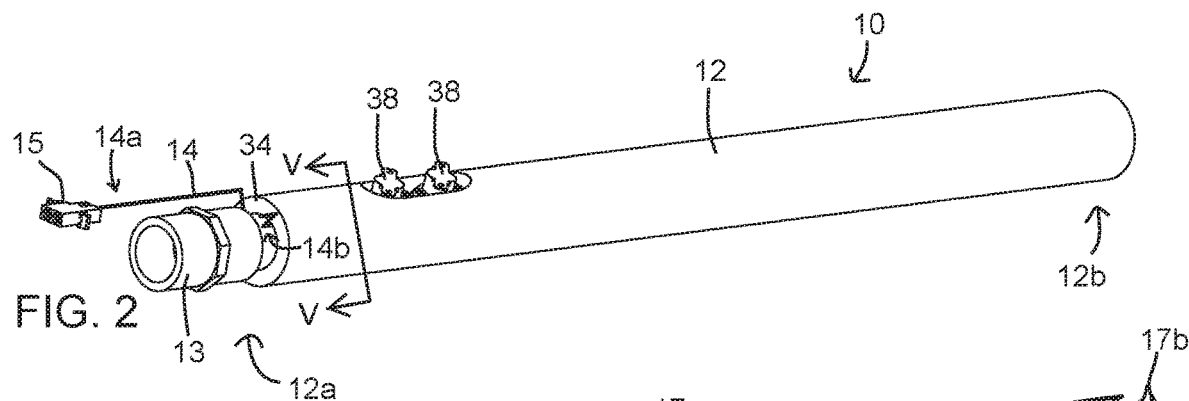
FIG. 2 is a perspective view of a heated pipe system for a drain or vent, in accordance with the present invention.
Figure 3:
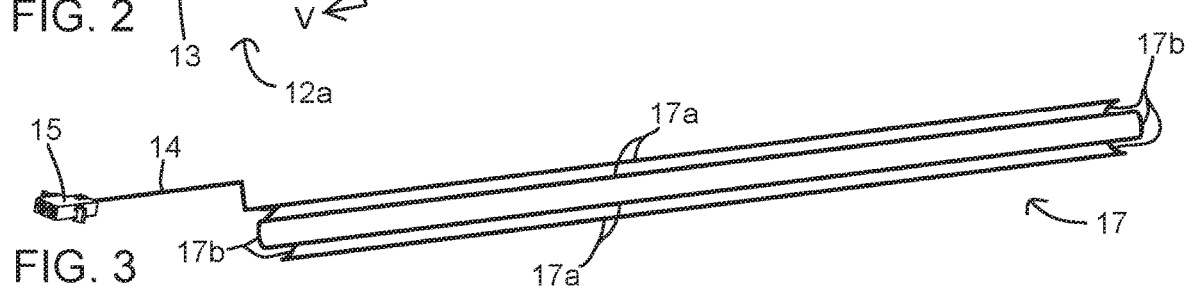
FIG. 3 is a perspective view of a resistance wire of the heated pipe of FIG. 2, depicting the routing path of the resistance wire as it is disposed in the heated pipe.
Figure 4:
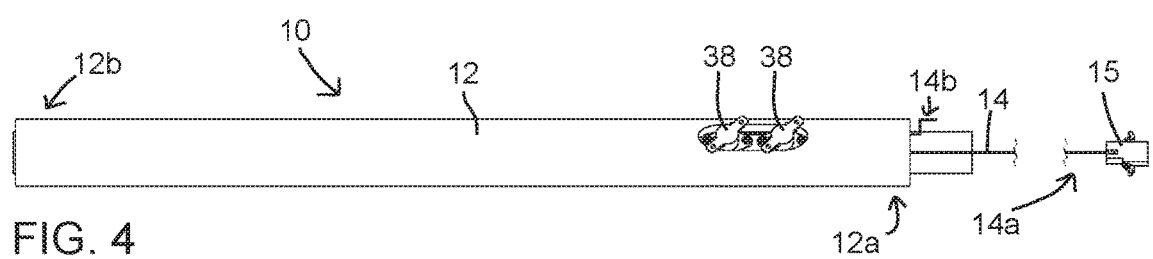
FIG. 4 is an elevation view of the heated pipe of FIG. 2.
Figure 5:
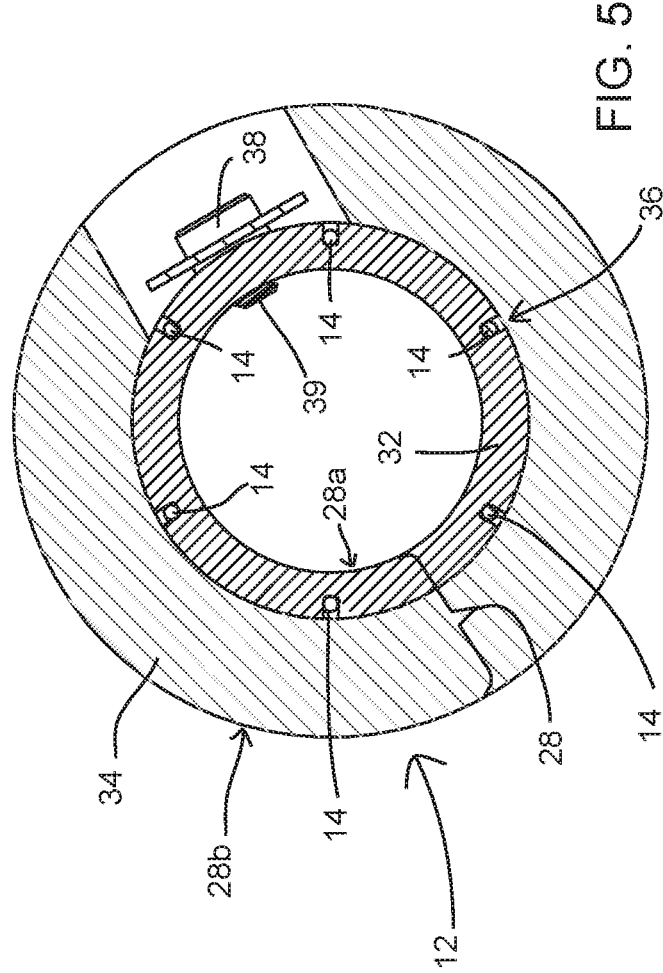
FIG. 5 is a sectional view of the heated pipe system taken along the line V-V of FIG. 2.

The heated pipe system 10 includes the pipe 12 with the resistance wire 14 having a known resistance (as measured in ohms) embedded in a wall 28 of the pipe 12, as best illustrated in FIG. 5. The pipe 12 is provided for discharging a fluid, such as a condensate liquid or a vapor from an air conditioning system, such as the furnace or boiler 16 (FIG. 1). The resistance wire 14 is electrically coupled at a first end 14a to one side of a detachable or separable electrical connector or terminal 15 (FIGS. 3-5). A second end 14b of the wire 14 is terminated proximate a portion of the pipe 12, such as within the pipe wall 28 or at an exterior portion of the pipe as shown in FIGS. 2 and 4. The terminal 15 is provided for removeably and electrically coupling the resistance wire 14 to a low voltage transformer 30 (see FIG. 6) adapted to supply low voltage DC or low voltage AC power to the resistance wire 14. The low voltage power supplied to the resistance wire 14 causes the resistance wire 14 to increase in temperature. The heat from the increase in temperature is transferred from the resistance wire into the wall 28 of the pipe 12. The heat in the pipe 12 is transferred to the contents of the pipe 12 and thereby either increases or maintains the temperature of the contents inside the pipe 12. The added heat transferred to the pipe 12 and contents of the pipe maintains the pipe 12 at a temperature above the ambient air surrounding the pipe 12, and thus maintains the pipe 12 and contents at a temperature above the freezing point when the ambient air (outside the pipe) is at or below the freezing point.

FIG. 3 illustrates a possible routing path 17 of the resistance wire 14 as it is disposed in the pipe wall 28. The resistance wire 14 is uninterrupted between its first end 14a and second end 14b and the routing path 17 includes a plurality of long runs 17a of the wire 14 extending parallel to the longitudinal axis of the pipe 12 and short runs 17b extending substantially perpendicular to the long runs around the circumference of the pipe 12. As best shown in FIG. 5, the wire 14 includes six (6) long runs 17b disposed in spaced arrangement around the circumference of the pipe wall 28. While the path 17 of the illustrated embodiment is defined as shown in FIG. 3, the routing path 17 may vary as necessary as a function of various dimensional and atmospheric factors, including the inner and/or outer surface area of pipe 12 that requires heating, the fluid flow volume experienced by the pipe during operation of the connected air conditioning system, or the extent of exposure of the pipe 12 to atmospheric conditions. The resistance wire 14 may be a nichrome wire consisting of an alloy of nickel and chromium, such as Nichrome 80 wire, although it will be appreciated that other compositions of resistance wire may be utilized. The resistance wire 14 is illustrated as having a round or circular cross-section (see FIG. 5), however, it will be appreciated that the wire 14 may be defined by other cross-sectional shapes including flattened cross-sections, such as a rectangular cross-section. Optionally, a wire having a lower resistance may be coupled or spliced between the first end 14a of the resistance wire 14 and the terminal 15 and/or the transformer 30.

As best shown in the illustrated embodiment of FIG. 5, the pipe wall 28 is defined between an interior surface 28a and an exterior surface 28b. The pipe wall 28 includes two layers, an inner layer 32 for containing the fluid inside the pipe 12 and an outer layer 34 to insulate the pipe 12 and the wire 14 disposed in the pipe wall 28. The resistance wire 14 is embedded in a channel 36 formed in an outer portion of the inner layer 32. The inner layer 32 may be formed of rigid or semi-rigid chlorinated polyvinyl chloride (CPVC), polyvinyl chloride (PVC), or similar pipe material. The outer layer 34 may be formed of a similar material as the inner layer 32 or a material that is relatively more flexible than the inner layer 32, such as flexible PVC tubing. While the pipe 12 of the illustrated embodiments is shown as having two layers, it will be appreciated that the pipe 12 may be extruded or formed with a single unitary pipe wall having the resistance wire 14 integrally disposed therein. Optionally, the pipe may be a pre-manufactured commercially available pipe (e.g. schedule 40 PVC pipe) and a channel may be formed or cut into the wall of the pipe to receive and support the resistance wire 14 and a protective sleeve may be disposed over the pre-manufactured pipe to protect and secure the resistance wire 14 inside of the channel, such as illustrated and described in U.S. provisional application Ser. No. 62/915,332, filed Oct. 15, 2019, which is hereby incorporated herein by reference in its entirety. A sealing material, such as fire-rated caulk, may be used to secure the resistance wire 14 in the channel. Further optionally, a hole may be drilled or otherwise formed longitudinally inside the wall of the pipe (such as a pre-manufactured commercially available pipe) to receive and support the resistance wire 14 in the wall 28 of the pipe 12.

The transformer 30 voltage output and the length and gauge of the resistance wire 14 are chosen as a function of the length of the pipe 12 to be heated, such that the flow of electricity supplied to the resistance wire 14 is sufficient to heat the pipe 12 to a temperature above freezing without overheating or melting the pipe 12. An exemplary electrical schematic of the heated pipe system 10 for use as a condensate drain is provided in FIG. 6. In the illustrated embodiment of FIGS. 2, 4, and 5, the pipe 12 has a length of about twenty-four (24) inches and an inner diameter of about three-quarters (0.75) of an inch. In the illustrated embodiment, the total length of the exemplary resistance wire 14 is twelve (12) feet. An exemplary voltage output of the transformer 30 is twenty four volts (24V DC), stepped down and converted from a standard circuit (120V AC). A listing of contemplated wire gauges for wire 14 are provided in FIG. 6, e.g. an 18 gauge Nichrome-80 wire at the twelve feet length as provided with the heated pipe system 10 provides 4.8 ohms of resistance, etc.

Figure 6:
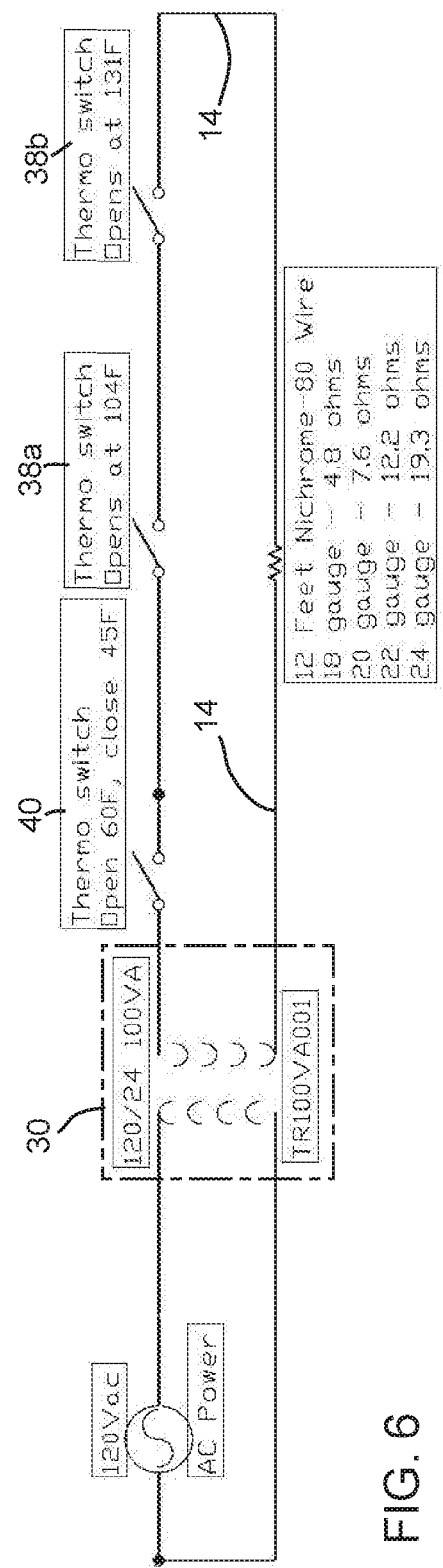
FIG. 6 is an exemplary electrical schematic for the heated pipe system of FIG. 2.

In the illustrated embodiments of FIGS. 2, 4, and 6, a pair of limit or safety switches 38 are included with the heated pipe system 10 to limit the maximum temperature that the pipe 12 can reach, such as to prevent overheating of the pipe 12. Optionally, a temperature sensor portion 39 of the safety switch 38 may extend into the interior of the pipe 12, such that the sensor portion 39 is in fluid communication with the fluid inside of the pipe 12 to sense a temperature of the fluid passing through the pipe 12 (FIG. 5). It will be appreciated that a single safety switch 38 may provide sufficient protection against overheating. The limit switches 38 include a maximum safe-operating temperature limit such that when the temperature of the pipe 12 reaches that limit the switch 38 opens to interrupt the flow of electricity through the wire 14. When the temperature of the pipe 12 is below the maximum limit, the switch 38 is closed allowing electricity to flow through the wire 14. In the exemplary embodiment illustrated in the schematic of FIG. 6, the first limit switch 38a has a maximum safe-operating temperature limit of 104° F. and the second limit switch 38b has a limit of 131° F.

The heated pipe system 10 can be operated in an always-on state or it may include a temperature controller or thermostat switch 40 (FIG. 6) to selectively energize the heated pipe system 10 once the outdoor ambient air temperature or the indoor ambient air temperature around the pipe 12 falls to a predetermined temperature at or above freezing. The thermostat switch 40 may include either or both of an indoor thermostat and an outdoor thermostat in communication with the switch 40. The outdoor thermostat would be disposed on an exterior or outside of a building to sense an outdoor temperature, such as the ambient air temperature at the location where the pipe 12 extends beyond or exits through the wall 24 or roof 50. The thermostat switch 40 may include an operating temperature range wherein at a lower programmed temperature the thermostat switch 40 is closed or closes to energize the system 10 and at an upper programmed temperature the switch 40 is open or opens to de-energize the system 10. In the exemplary embodiment of FIG. 6, the switch 40 has an operating temperature range of 45° F.-60° F., as such the switch will close when the ambient temperature is 45° F. or below and the switch 40 will open if the ambient temperature is 60° F. or above. For example, if the heated pipe system 10 is de-energized (i.e. the switch is open) and the ambient temperature falls to 45° F., the switch 40 will close to energize the system 10 to begin heating the pipe 12. If the heated pipe system 10 is energized (i.e. the switch is closed) and the ambient temperature rises to 60° F., the switch 40 will open to de-energize the system 10 to stop heating the pipe 12. The switch 40 only changes its position (i.e. open or closed) if it meets or exceeds the upper or lower limits of the range, such that it will maintain its current position whenever the ambient temperature is between 46° F.-59° F. In other words, once the temperature has risen to 60° F. and the switch 40 has opened, the switch will remain open until the temperature falls to 45° F. Conversely, once the temperature has fallen to 45° F. and the switch 40 has closed, the switch will remain closed until the temperature rises to 60° F. or above.

In the illustrated embodiment of FIGS. 7-11, a heated pipe system 42, similar to heated pipe system 10, is provided for a roof drain system 44, for maintaining or regulating a liquid or vapor filled drain pipe 46 at a temperature high enough to prevent the liquid or vapor inside the pipe 46 from freezing or frosting. The roof drain system 44 includes roof drain inlets 48 and drain pipes 46 formed as heated pipe systems 42 and disposed with a building roof 50. Drain pipes 46 and drain inlets 48 direct rain water and snow melt water away from the roof 50. The water can sit in the drain pipes 46 for extended periods of time and become susceptible to freezing when exposed to freezing temperatures. Vapor that rises out of the drain pipes 46 and the inlets 48 can condensate inside of the pipes 46 and inlets 48 and can freeze and build up a layer of frost and potentially fully block the drain pipes 46. If the drain pipes 46 become fully blocked, snow melt and rain water can accumulate on the roof 50, introducing significant weight and loads on the roof 50 which can become a roof collapse and/or leak hazard. The heated pipe systems 42 for the roof drain system 44 prevent freezing of liquid or vapor inside the drain pipes 46.

Figure 10:
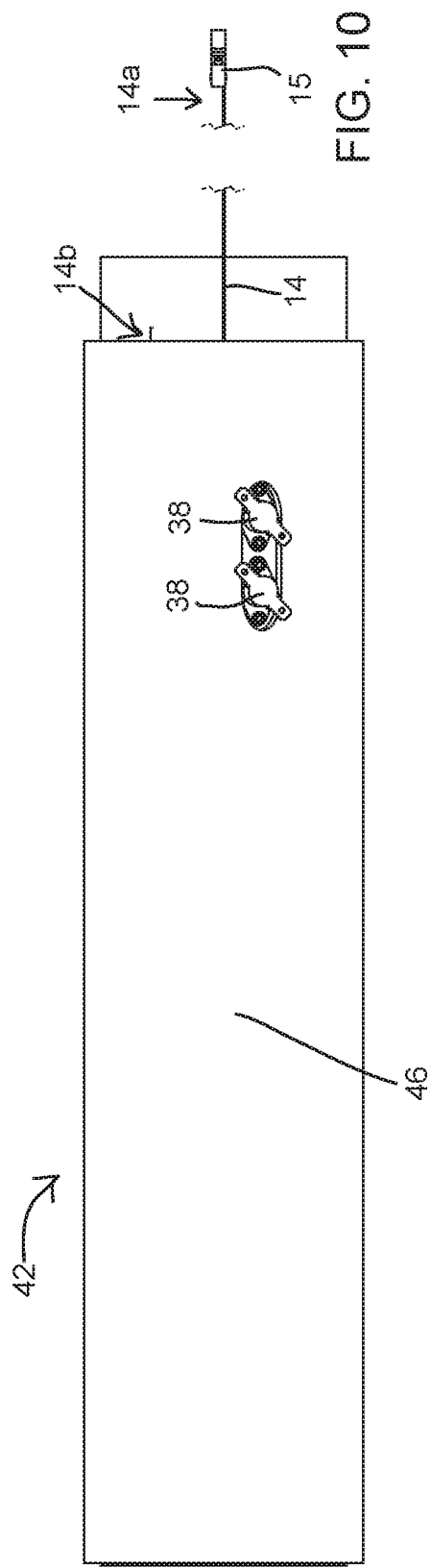
FIG. 10 is an elevation view of the heated pipe system of FIG. 8.

The heated pipe system 42 includes similar structure to that of heated pipe system 10, including a heating element in the form of a resistance wire 14 embedded in the pipe 46, an electrical connector 15 coupled to the wire 14, and maximum temperature shutoff sensors or switches 38 (FIGS. 8-10). The pipe 46 has a pipe wall 52 defined between an interior surface 52a and an exterior surface 52b. The pipe wall 52 includes an inner layer 54 and an outer layer 56, which are similar to layers 32 and 34 of pipe system 10 (FIG. 9). Similar to system 10, the resistance wire 14 may be embedded in a channel formed in an outer portion of the inner layer 54. It will be appreciated that the pipe 46 may be extruded or formed with a single unitary pipe wall having the resistance wire 14 integrally disposed therein.

The substantial difference between heated pipe system 42 and heated pipe system 10 is the setting in which the system is deployed, which may dictate the required overall dimensions of the pipe 46. For example, in the illustrated embodiments of FIGS. 7-10, the pipe 46 has a necessarily large inner diameter to provide for adequate water flow as it is required for quickly removing/draining water from the roof 50. A smaller diameter pipe, which may be adequate for draining low-flow condensate from a furnace, or for venting a furnace, such as shown in FIG. 1, may not be large enough to drain water at a quick enough rate to avoid flooding on the roof 50, for example. A pipe fitting or coupler, similar to coupler 13, may be provided with pipe system 42 to couple the pipe 46 to the non-heated pipes of the roof drain system 44. As illustrated in FIG. 9, the resistance wire 14 is routed through the wall 52 of the pipe 46 and includes ten (10) long runs located in spaced arrangement around the circumference of the wall 52. The number of longitudinal runs of wire 14 in pipe 46 may vary as a necessary function of various dimensional and atmospheric factors expected to be experienced by the drain system 44, including those described above for heated pipe system 10.

Figure 11:
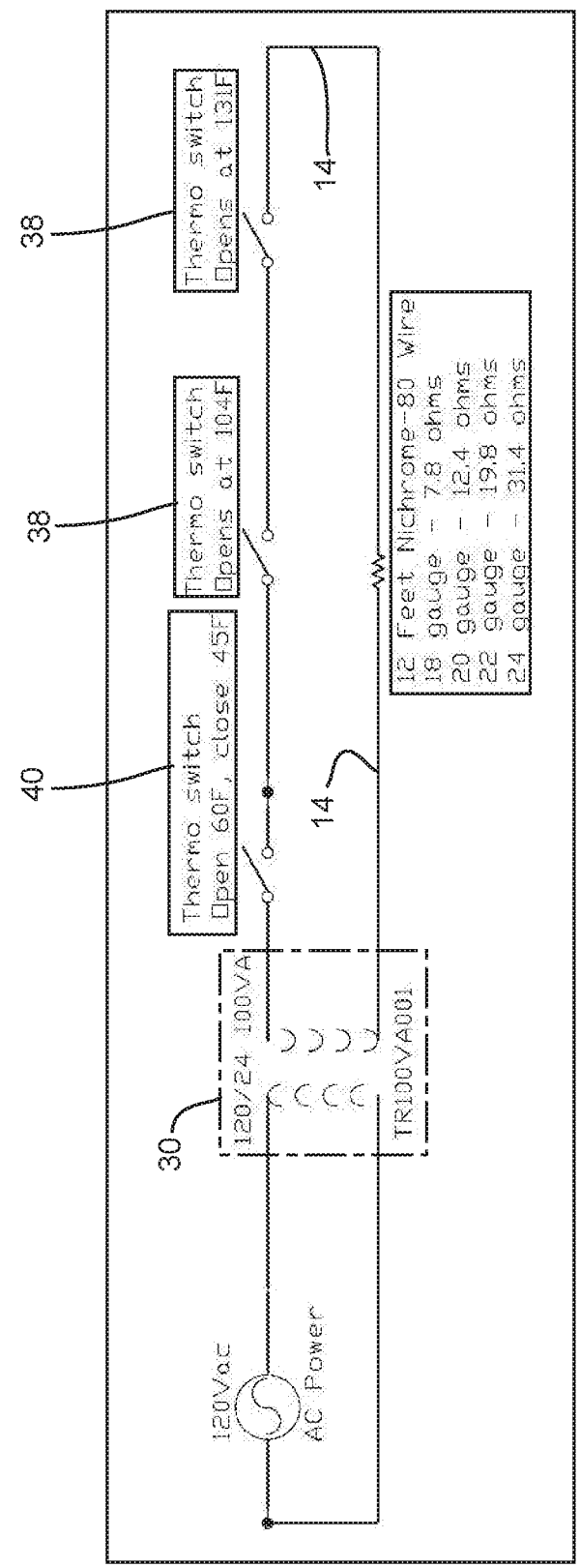
FIG. 11 is an exemplary electrical schematic for the heated pipe system of FIG. 8.

An exemplary electrical schematic of the heated pipe system 42 for use in a roof drain system 44 is provided in FIG. 11. The heated pipe system 42 includes a temperature controller or thermostat switch 40 (FIG. 11) similar to that described with pipe system 10. The switch 40 has an operating range lower limit of 45° F. and an upper limit of 60° F. The exemplary pipe 46 of FIGS. 8-10 includes a length of about twenty-four (24) inches and an inner diameter of about four (4) inches. As illustrated in FIG. 11, the total length of the exemplary resistance wire 14 is twelve (12) feet. The temperature limit of the first switch 38a is 104° F. and the second switch limit 38b is 131° F. An exemplary voltage output of the transformer 30 is twenty four volts (24V DC) down from a standard circuit (120V AC). A listing of contemplated wire gauges for wire 14 are provided in FIG. 11, e.g. an 18 gauge Nichrome-80 wire at the twelve feet length as provided with the heated pipe system 42 provides 7.8 ohms of resistance, etc.

Figures 14, 15:
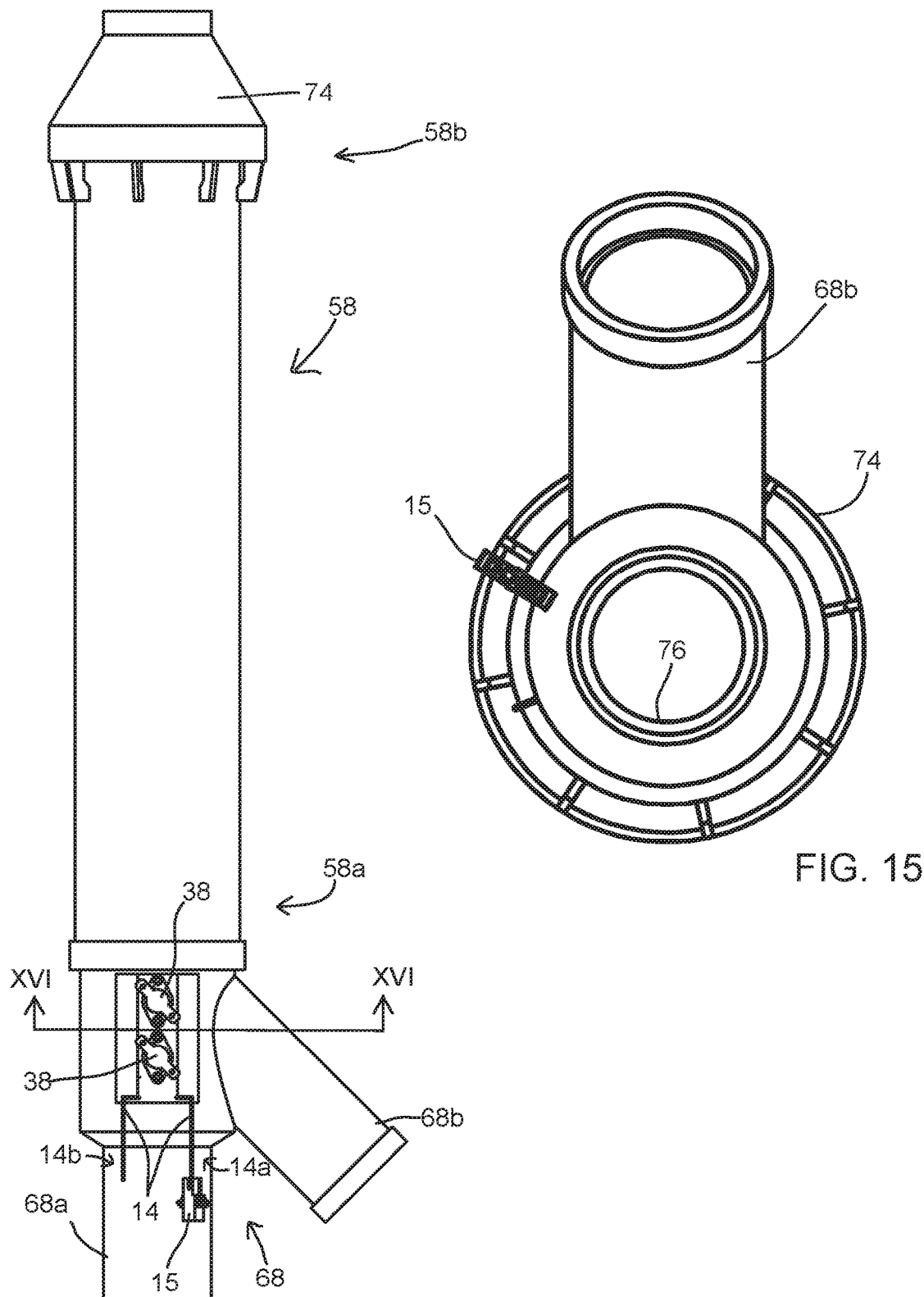
FIG. 14 is an elevation view of a heated two-way vent pipe system in accordance with the present invention.
FIG. 15 is a bottom-up view of the heated two-way vent pipe system of FIG. 14.

Referring to FIGS. 12-17, a heated two-way vent pipe system 58 is provided for venting exhaust fluid, such as steam or natural gas exhaust, from an air conditioning system, such as a furnace 60, through either a sidewall 62, as shown in FIG. 12, or a roof 64, as shown in FIG. 13, of a building 66. The heated pipe system 58 also provides for fluid, such as clean air, to be drawn into the furnace 60 while requiring only one hole to be provided through the wall 62 or roof 64, thereby limiting potential areas that may be susceptible to leaking, such as due to rain or snow. A branch or Y pipe fitting 68 is provided at a proximal end 58a of the system 58 and provides for connection of the system 58 to both an exhaust line 70 and an intake line 72 extending from the furnace 60. In the illustrated embodiments of FIGS. 12 and 13, the exhaust line 70 is coupled to the straight portion 68a of the branch 68 and the intake line 72 is coupled to the oblique portion 68b of the branch 68. A hood or pest deterrent 74 is coupled to a distal end 58b of the system 58 and provided for resisting or preventing foreign material from entering the system 58, such as rain or rodents (FIG. 14).

Figure 16:
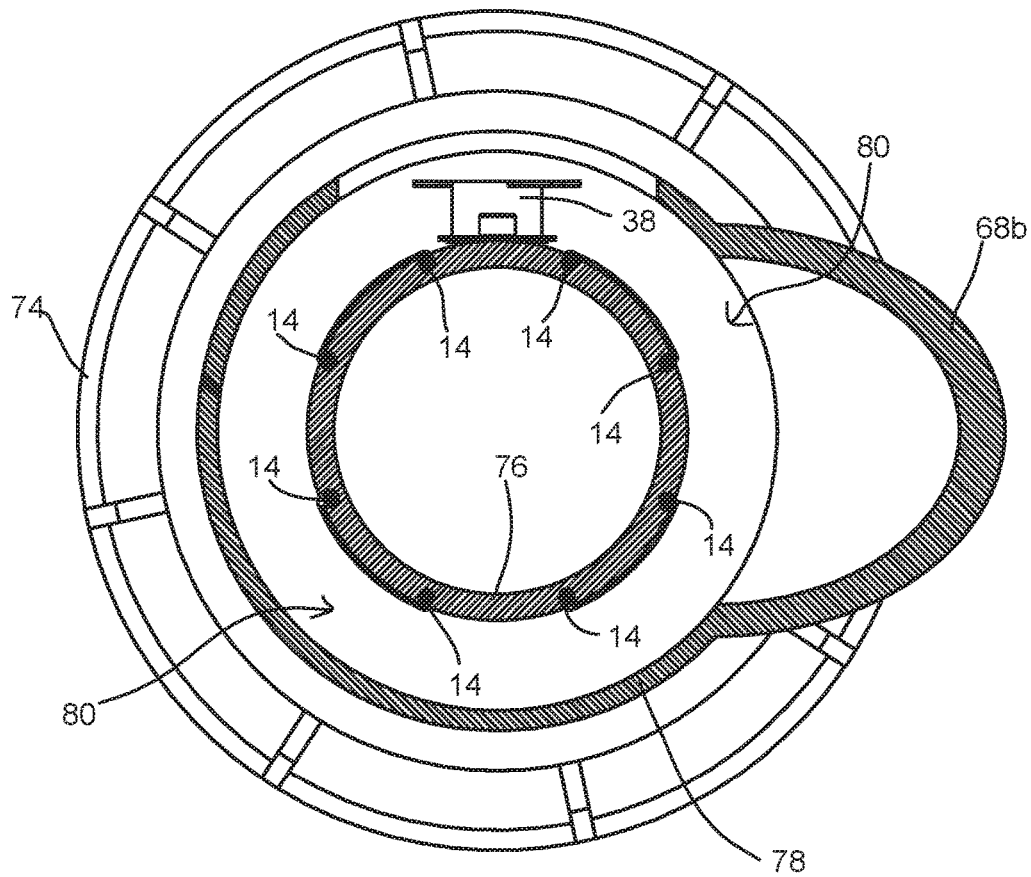
FIG. 16 is an enlarged sectional view of the heated two-way vent pipe system taken along line XVI-XVI of FIG. 14.

As best shown in FIG. 16, the main body of the heated two-way pipe system 58 is formed of two pipes, an inner pipe 76 and an outer pipe 78 disposed around the inner pipe 76 with a fluid-gap, air-gap, or space 80 defined between the inner pipe and outer pipe. Pipes 76 and 78 may be concentric with one another. The air-gap 80 is in fluid communication with the oblique branch and provides for intake air to be drawn from outside the building 66 through the oblique branch 68*b* and through the intake line 72 into the furnace 60 (FIG. 16). The interior of inner pipe 76 is only in fluid communication with the straight branch 68*a* of the branch 68 and therefore the exhaust line 70 from the furnace 70 allowing the exhaust fluid to vent from the furnace to the outside of the building 66. As such, the interior of pipe 76 and the air-gap 80 are not in fluid communication with each other and no exhaust fluid passes through the air-gap 80. Conversely no intake air passes through the interior of inner pipe 76.

The inner pipe 76 is formed substantially the same as pipes 12 and 46 of heated pipe systems 10 and 42. The inner pipe 76 includes a heating element in the form of a resistance wire 14 embedded in the wall of the pipe 76 (FIG. 16), an electrical connector 15 coupled to the wire 14 (FIGS. 14 and 15), and maximum temperature shutoff sensors or switches 38 (FIGS. 14-17) disposed through the pipe 76 that function in substantially similar fashion as systems 10 and 42. In the illustrated embodiment of FIG. 16, the resistance wire 14 is routed through the wall of pipe 76 and includes eight (8) long runs located in spaced arrangement around the circumference of the pipe 76. Because the inner pipe 76 is in fluid communication with both the exhaust fluid being exhausted through the interior of inner pipe 76 and the intake air being drawn through the air-gap 80, the heat from the resistance wire 14 is transferred to both the exhaust fluid and the intake air, thereby resisting frost or freezing of fluids inside either the inner pipe 76 and/or the air-gap 80.

Figure 17:
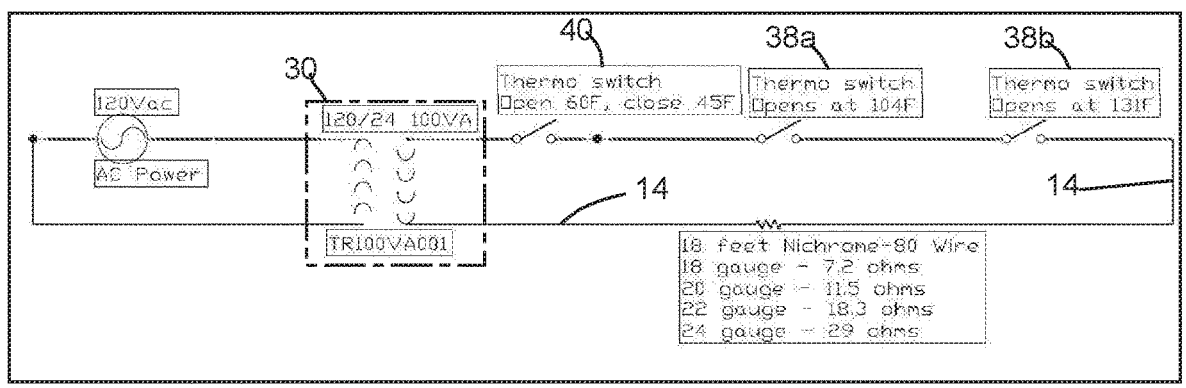
FIG. 17 is an electrical schematic for the heated two-way vent pipe system of FIG. 14.

An exemplary electrical schematic of the heated two-way vent pipe system 58 for use with air conditioning systems is provided in FIG. 17. The heated pipe system 58 includes a temperature controller or thermostat switch 40 (FIG. 17) similar to that described with heated pipe systems 10 and 42. The switch 40 has an operating range lower limit of 45° F. and an upper limit of 60° F. (FIG. 17). The exemplary inner pipe 76 of FIGS. 14-16 includes a length of about twenty-nine and one half (29.5) inches and an inner diameter of about two (2) inches. As illustrated in FIG. 17, the total length of the exemplary resistance wire 14 is eighteen (18) feet. The temperature limit of the first switch 38*a* is 104° F. and the second switch limit 38*b* is 131° F. An exemplary voltage output of the transformer 30 is twenty four volts (24V DC) down from a standard circuit (120V AC). A listing of contemplated wire gauges for wire 14 are provided in FIG. 17, e.g. an 18 gauge Nichrome-80 wire at the eighteen feet length provided with the heated two-way vent pipe system 58 provides 7.2 ohms of resistance, etc.

Accordingly, the heated pipe systems of the present invention provide a low-cost and efficient temperature regulator for a drain or vent pipe, to prevent the drain or vent pipe from freezing when exposed to below freezing temperatures. A resistance wire electrically embedded in the pipe is configured for coupling to a voltage transformer and is heated as a result of the voltage passing through the wire. The resistance wire is embedded in the wall of the pipe. The resistance wire transfers heat to the wall of the pipe to regulate the temperature of the pipe and the contents inside or surrounding the heated pipe. The resistance wire may be integrally molded in the wall of the pipe or may be disposed in a channel cut in the wall of the pipe. A limit or safety switch may be included with the heated pipe system to disable the resistance wire to ensure that the pipe or contents inside the pipe do not overheat. A temperature controller may be provided to turn the heated pipe system on and off at a set ambient temperature to reduce electricity use when freezing is not a concern. The temperature controller may include a thermostat disposed outside of a building. The length and gauge of the resistance wire and the voltage output of the transformer is chosen as a function of the desired temperature at which the pipe is to be maintained. The heated pipe system may include one or more overlapping or concentric pipes to provide for substantially independent two-way fluid movement while preventing frost or freezing of the fluid inside or surrounding the heated pipe.

Changes and modifications in the specifically described embodiments can be carried out without departing from the principles of the present invention, which is intended to be limited only by the scope of the appended claims, as interpreted according to the principles of patent law, including the doctrine of equivalents.

The embodiments of the invention in which an exclusive property is claimed are defined as follows:

1. A heated pipe system for preventing freezing of fluid in said heated pipe system, said heated pipe system comprises:
    a unitarily formed first pipe having an interior surface for containing a first fluid and an exterior surface defined at the outside diameter of said first pipe;
    a second pipe disposed around said first pipe, wherein said first pipe and said second pipe define a two-way vent assembly having a gap formed between said first and second pipes, said gap permits a second fluid to be drawn through said heated pipe system independent of the first fluid contained in said first pipe;
    a channel formed in said first pipe;
    a resistance wire disposed in said channel between said exterior surface and said interior surface of said first pipe; and
    a voltage transformer in electrical communication with said resistance wire, said transformer selectively operable to transform a first voltage from a power source to a second voltage that is applied to said resistance wire, wherein the first voltage is higher than the second voltage;
    wherein said resistance wire increases in temperature when the second voltage is applied to said resistance wire and transfers heat to said first pipe such that said first pipe is heated to a temperature above a freezing temperature to prevent fluid inside said first pipe and fluid between said first and second pipes from frosting or freezing.

2. The heated pipe system of claim 1, wherein an entirety of said resistance wire is disposed between said exterior surface and said interior surface of said first pipe.

3. The heated pipe system of claim 1, wherein said first pipe forms an inner, first layer of said heated pipe system, and said heated pipe system further comprises an outer, second layer disposed around and in contact with said exterior surface of said first pipe such that said outer layer insulates said resistance wire and said inner layer.

4. The heated pipe system of claim 1, wherein said voltage transformer is adapted to transform the first voltage from 120 volts AC down to the second voltage, wherein the second voltage is chosen from one of 24 volts DC and 24 volts AC.

5. The heated pipe system of claim 1, further comprising a separable electrical connecter disposed between said resistance wire and said voltage transformer such that said resistance wire is selectively separable from said transformer.

6. The heated pipe system of claim 1, further comprising a limit switch adapted to selectively disconnect power from said heated pipe system when said first pipe reaches a predetermined temperature.

7. The heated pipe system of claim 1 in combination with one chosen from an air conditioning system and a roof drain system.

8. The heated pipe system of claim 1, wherein said two-way vent assembly comprises a branch pipe fitting disposed at a proximal end of said assembly, said branch pipe fitting having an intake branch coupled to an air conditioning system intake line and an exhaust branch coupled to an air conditioning system exhaust line.

9. The heated pipe system of claim 1, further comprising a temperature controller adapted to selectively energize said resistance wire when an ambient air temperature reaches a predetermined temperature.

10. A heated pipe system for preventing freezing of fluid in said heated pipe system, said heated pipe system comprises:
    a unitarily formed first pipe having an interior surface for containing a first fluid and an exterior surface defined by the outside diameter of said first pipe;
    a second pipe disposed around said first pipe, wherein said first pipe and said second pipe define a two-way vent assembly having a gap formed in a space defined between said first and second pipes, said gap provides a fluid conduit through which a second fluid can be drawn through said heated pipe system independent of the first fluid contained in said first pipe;
    a coupler disposed at a proximal end of said heated pipe system for coupling said system to another pipe;
    a resistance wire disposed between said exterior surface and said interior surface of said first pipe;
    a voltage transformer selectively operable to transform a first voltage from a power source to a second voltage, wherein the first voltage is higher than the second voltage; and
    an electrical connector disposed at an end of said resistance wire which extends beyond said first pipe wall, said electrical connector adapted for coupling said resistance wire to said voltage transformer;
    wherein said resistance wire is configured to increase in temperature when the second voltage is applied to said resistance wire when said electrical connector is in electrical communication with said voltage transformer; and
    wherein said resistance wire transfers heat to said first pipe such that said first pipe is heated to a temperature above a freezing temperature to prevent fluid inside said first pipe and fluid between said first and second pipes from frosting or freezing.

11. The heated pipe system of claim 10, further comprising a limit switch adapted to selectively disconnect power from said heated pipe system when said first pipe reaches a predetermined temperature.

12. The heated pipe system of claim 10, further comprising a temperature controller adapted to selectively energize said resistance wire when the temperature of the ambient air surrounding a thermostat of said temperature controller reaches a predetermined temperature.

13. The heated pipe system of claim 10, wherein said two-way vent assembly comprises a branch pipe fitting disposed at a proximal end of said assembly, said branch fitting having an intake branch coupled to an air conditioning system intake line and an exhaust branch coupled to an air conditioning system exhaust line.

14. A heated two-way vent system for independently venting and intaking fluids in two distinct fluid flows and preventing freezing of both fluids, said heated two-way vent system comprising:
    a unitarily formed inner pipe for containing a first fluid and having one end open permitting the first fluid to vent freely from said inner pipe;
    a unitarily formed outer pipe for containing a second fluid and disposed around said inner pipe, said outer pipe having one end open adjacent said open end of said inner pipe and permitting the second fluid to vent freely from said outer pipe;
    a gap formed between said inner pipe and said outer pipe, said gap permitting the second fluid to vent freely from said open end of said outer pipe; and
    a heating element embedded in said inner pipe;
    wherein the first fluid contained in said inner pipe and the second fluid contained in said outer pipe are maintained separate from one another; and
    wherein said heating element transfers heat to said inner pipe such that said inner pipe is heated to a temperature at least above a freezing temperature to prevent fluid inside said inner pipe and said gap from frosting or freezing.

15. The heated two-way vent system of claim 14, wherein said heating element comprises a resistance wire embedded in said inner pipe, said resistance wire coupled to a voltage transformer selectively operable to transform a first voltage from a power source to a second voltage that is introduced to said resistance wire, wherein the first voltage is higher than the second voltage, and wherein said resistance wire is configured to increase in temperature when the second voltage is introduced to said resistance wire.

16. The heated two-way vent system of claim 14, further comprising a branch pipe fitting disposed at a proximal end of said vent system, said branch fitting having an intake branch coupled to an air conditioning system intake line and an exhaust branch coupled to an air conditioning system exhaust line.

17. The heated two-way vent system of claim 14, further comprising a limit switch adapted to selectively disconnect power from said heated two-way vent system when said inner pipe reaches a predetermined temperature.

18. The heated two-way vent system of claim 14, further comprising a temperature controller adapted to selectively energize said heating element when the temperature of the ambient air surrounding a thermostat of said temperature controller reaches a predetermined temperature.

19. The heated two-way vent system of claim 14, in combination with an air conditioning system.

* * * * *